United States Patent Office 3,232,153
Patented Feb. 1, 1966

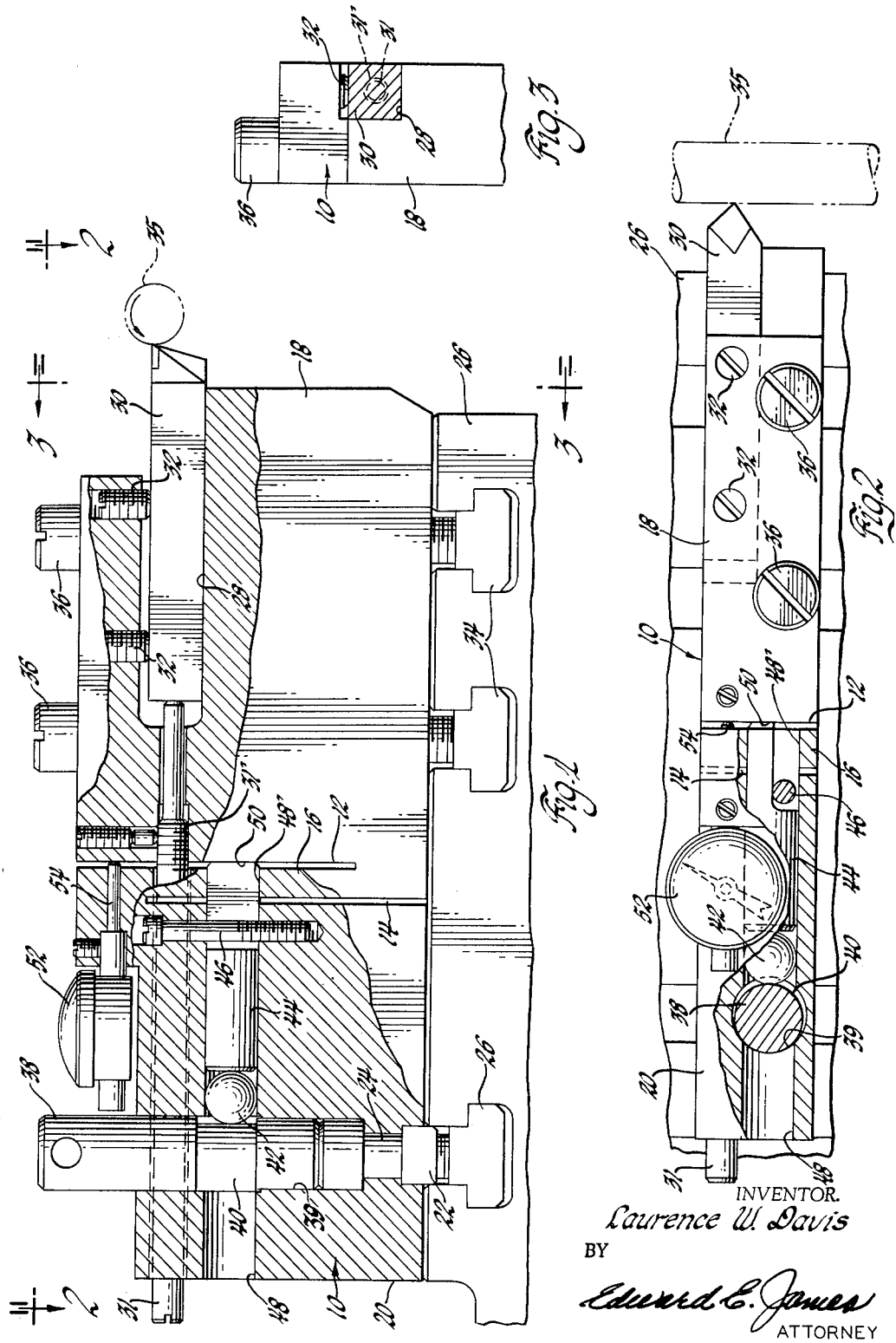

3,232,153
ADJUSTABLE TOOL BLOCK
Laurence W. Davis, Saginaw, Mich., assignor to General Motors Corporation, Detroit, Mich., a corporation of Delaware
Filed May 28, 1964, Ser. No. 371,027
11 Claims. (Cl. 82—36)

This invention relates to a toolholder and more particularly to a toolholder having adjustable means for securing and positioning a tool relative to a workpiece.

Conventional toolholders generally include a tool supporting block or member mountable on a tool carriage or frame of a machine tool. A cutting tool is normally mounted within a slot formed in the block and maintained longitudinally by an adjusting screw and secured laterally by several clamping screws. To adjust the tool of such a toolholder, it is first necessary to loosen the tool clamping screws and to then rotate the adjusting screw to shift or permit movement of the tool longitudinally of the slot to provide a new tool cutting dimension or radius with respect to the workpiece. Upon loosening the tool clamping screws, however, the cutting tool is free to move both longitudinally and laterally of the tool mounting slot. Such freedom of tool movement requires considerable time consuming trial and error in adjusting the cutting tool longitudinally of such a conventional tool block. After adjusting the tool longitudinally, it is of course necessary to retighten the tool clamping screws. Such retightening often contributes substantial inaccuracies to the tool position actually obtained in contrast to the desired and initially adjusted tool position.

In the past, some special purpose toolholders have been provided with means for adjusting a tool mounting portion or member angularly or arcuately relative to a supporting portion or member. In some, the tool mounting portion or member has been resiliently connected to a supporting portion or member with tool adjustment being effected by means varying angular deflection between these portions or members. Such adjustable toolholders have generally varied the workpiece finishing angle of the tool, have required locking devices to maintain the tool in an adjusted position and have lacked sufficient rigidity to maintain the desired tool adjustment or workpiece finishing dimension during machine operation.

The present invention contemplates an improved adjustable tool supporting block structure of relatively simple, rugged, easily and inexpensively manufactured design capable of providing fine, vernier tool adjustment longitudinal of the machine secured block without loosening of the tool clamping screws.

With an adjustable toolholder constructed in accordance with the present invention, tool adjustments can be made faster and with far less skill than required with conventional toolholders or with previous special purpose adjustable toolholding members. Longitudinal adjustment of the cutting tool may be accomplished by the toolholder of the invention without modifying the preferred angular relationship of the workpiece finishing or cutting surfaces or edges of the tool with respect to the workpiece thus prolonging tool life and operational use between resharpening of the tool. Hence, the time required to properly adjust the cutting tool and to keep the cutting edges of the tool in proper sharpness are greatly reduced by use of this invention.

In an illustrative toolholder, a tool mounting block is partially divided into three sections by two closely spaced parallel slots substantially intersecting the block from opposite sides to form a deflective intermediate portion extending between and joining a reactive end portion and a tool mounting end portion. The reactive end portion of the block is normally secured to the associated machine in fixed spaced relation to the workpiece. An adjusting means supported by this reactive block portion is operable to shift the tool mounting portion longitudinally of the reactive portion against the deflective biasing action of the intermediate block portion. The tool mounting portion is then suitably secured to the machine to maintain the effected tool adjustment.

The foregoing and other objects, advantages and features of the invention will be apparent from the following description of the illustrative embodiment, having reference to the accompanying drawing, in which:

FIGURE 1 is a side elevational view of an adjustable toolholder constructed in accordance with the invention and is partially broken away and shown in section to show certain structural details;

FIGURE 2 is a plan elevational view taken substantially in the direction of the arrows indicated at 2—2 of FIGURE 1 and is similarly partially broken away and shown in section to further illustrate certain structural details; and FIGURE 3 is a fragmentary elevational view of the tool mounting end of the illustrative toolholder and is taken substantially in the direction of the arrows indicated at 3—3 of FIGURE 1.

Referring more particularly to the drawing, the illustrative toolholder comprises a block or body member 10. As best shown in FIGURE 1, this block is vertically cut from the upper and lower sides thereof to provide closely spaced parallel slots 12 and 14 substantially intersecting the block and forming an intermediate leaf spring portion 16 extending between and integrally joining a longitudinally adjustable tool supporting end portion 18 and a thrust reaction end portion 20. The thrust end portion 20 of this block is normally keyed at 22 and tightly secured at 24 to a tool carriage slide 26 of the associated machine tool. The tool supporting end portion 18 is slotted at 28 to receive a cutting tool 30. The cutting tool is positioned longitudinally within the tool mounting slot 28 by an elongated back-up screw 31. This tool engaging screw is spacedly embraced by and extends through aligned bores provided in the intermediate spring and reactive end portions of the block. The tool engaging end of the screw 31 is threadably adjusted at 31' and suitably locked within the tool supporting block portion. The tool 30 is normally secured within the slot 28 and maintained in back-up screw engagement by two self-locking screws 32.

During machine operation, the toolholding portion 18 of the block 10 is normally secured to machine carriage slides 34 by two clamping bolts 36. These bolts may be loosened to permit longitudinal adjustment of the tool supporting block portion 18 relative to fixed reaction portion 20 and the workpiece. When the bolts 36 are thus loosened, the tool mounting block portion 18 is normally maintained in its previously adjusted position. Adjustment of this block portion to establish a new tool position is effected against biasing action of the deflected intermediate spring portion 16. In the illustrative embodiment such adjustment is effected by controlled rotation of a frictionally maintained cam spindle 38. This cam spindle is rotatably journaled in a stepped diameter bore 39 extending vertically of the reactive block portion 20. An eccentric cam surface 40 formed on this spindle rotatably engages a ball 42 which is mounted in an intersecting horizontal bore 48 between the adjusting plunger 44. The ball 42 in turn rotatably and thrustably engages the adjacent end of a tool adjusting plunger 44. The plunger 44 is nonrotatably keyed at 46 and slidably mounted within aligned bores 48 and 48' extending longitudinally through the reaction block portion 20 and the intermediate spring portion 16, respectively. The end of the plunger 44 distal from the eccentric cam rotated ball thrustably engages the adjacent end face 50 of the tool mounted block portion 18. The eccentric cam is thus operable through the ball and plunger to effect and maintain adjustment of the tool relative to the workpiece until the bolts 36 have been retightened to again secure the adjusted tool mounting block portion 18 to the machine.

The tool adjustment effected by rotation of the eccentric cam spindle 38 may be read directly from a vernier dial indicator 52 suitably supported by the reaction block portion 20 and having a spring biased plunger 54 thrustably engageable with the end surface 50 of the toolholding block portion 18.

From the foregoing description, it will be seen that the illustrative embodiment of the invention provides an improved adjustable tool block of simple rugged design capable of providing the several stated objectives and advantages. It will be further apparent that various changes might be made in and from the structure and form of the illustrative embodiment without departing from the spirit and scope of the invention as defined in the following claims.

I claim:

1. An adjustable tool support comprising
   reaction means mountable on a machine and normally secured thereto in fixed spaced relation to a workpiece,
   tool supporting means mountable on the machine for limited linear adjustment between the reaction means and the workpiece,
   spring means interposed between and establishing an unbiased spaced relation between the reaction and tool supporting means,
   adjusting means operable to effect and maintain limited tool adjusting movement between said reaction and tool supporting means against the deflective biasing action of said spring means, and
   means for securing said tool supporting means on the machine in an adjusted tool position.

2. In an adjustable tool support,
   a reaction portion mountable on and normally secured to a machine tool in fixed spaced relation to a workpiece,
   a tool supporting portion mountable on the machine for limited tool adjusting linear movement between the reaction portion and the workpiece,
   means for securing the tool supporting block portion on the machine in an adjusted tool position,
   spring means extending between and joining transverse opposite sides of said portions,
   and tool adjusting means supported by the reaction portion and engageable with the tool supporting portion to effect limited linear adjustment between said portions against the deflective biasing action of said spring means.

3. In an adjustable tool support as set forth in claim 2, said adjusting means including
   a plunger reciprocably mounted centrally of said reaction portion and extending through the spring means and thrustably engaging the tool supporting portion,
   an eccentric cam rotatably journaled in the reaction portion and spaced from the adjacent end of the plunger,
   a ball rotatably interposed between said cam and the adjacent end of the plunger and operable upon rotation of the eccentric cam to shift the tool supporting portion relative to the reaction portion against said spring means to provide desired tool position relative to the workpiece,
   and means mounted by said reaction portion and operably engageable with the adjacent end surface of the tool supporting portion to indicate the linear tool adjustment effected by rotation of the eccentric cam.

4. An adjustable tool support comprising
   a reaction portion mountable on a machine and normally secured thereto in fixed spaced relation to a workpiece,
   a tool supporting portion mountable on the machine for limited linear movement between the reaction portion and the workpiece,
   a spring portion formed integrally of and extending between said reaction and tool supporting portions,
   tool adjusting means including a plunger reciprocably mounted in one of the reaction and tool supporting portions and extending through the intermediate spring portion and engaging the other of said reaction and tool supporting portions,
   an eccentric cam journaled in said one portion and operable through the plunger upon cam rotation to shift the tool supporting portion relative to the reaction portion against the biasing action of the deflected intermediate spring portion to effect and maintain an adjusted tool position relative to the workpiece,
   and means for securing the tool supporting portion on the machine in the adjusted tool position.

5. An adjustable toolholder comprising
   an elongated block divided intermediate its ends by closely spaced parallel slots substantially intersecting the block from opposite sides to form an intermediate spring portion deflectably joining two end portions of the block,
   means for securing one of the block end portions on a machine to form a fixed reaction member spaced transversely of a workpiece,
   means for supporting and securing a workpiece engageable tool on the other block end portion,
   means for securing the tool supporting block end portion intermediate the reaction end portion and the workpiece and releasable to permit linear tool adjustment within the deflective limits of the intermediate spring portion,
   and means operable when the means securing said tool supporting portion is released to effect linear tool adjusting movement between said block end portions against the deflective biasing action of said intermediate spring portion.

6. In an adjustable toolholder as set forth in claim 5, said adjusting means including,
   a plunger reciprocably mounted in one of the end portions and extending through the intermediate spring portion and normally engaging the adjacent end surface of the other block end portion, and
   a cam journaled in the plunger supporting block end portion and operably connected through the plunger to shift the tool supporting block end portion to provide the desired tool dimension relative to the workpiece.

7. An adjustable tool support mountable on a machine in spaced relation to a machine mounted workpiece, said support comprising
   an elongated block divided intermediate its ends by closely spaced parallel slots substantially intersecting the block from opposite sides to form an intermediate spring portion deflectably joining two end portions of the block,
   means for securing one of the block end portions on the machine to form a fixed reaction member spaced transversely of the workpiece and the other block portions,
   means for supporting and securing a workpiece engageable tool on the other block end portion,
   and means operable to effect and maintain linear tool adjusting movement between said block end portions against the deflective biasing action of said intermediate spring portion.

8. In an adjustable toolholder as set forth in claim 7, said tool adjusting means including, a plunger recipocably mounted in the reaction and intermediate spring portions of the block and normally engaging the tool supporting end portion of the block, cam means journaled in the plunger supporting block end portion and rotatably operable to shift the plunger and the tool supporting block end portion to provide the desired tool adjustment relative to the workpiece, and means for securing the tool supporting end portion to the machine independently of the reaction end portion to maintain the tool adjustment effected by said plunger and cam means.

9. An adjustable tool support mountable on a machine in spaced relation to a machine mounted workpiece, said tool support comprising an elongated block mountable on the machine to extend transversely of the workpiece and divided intermediate its ends by closely spaced parallel slots substantially intersecting the block from opposite sides to form an intermediate spring portion deflectably joining two spaced end portions of the block, means for securing one of the block end portions on the machine independently of the other end portion and normally forming a fixed reaction portion spaced from the workpiece, means for supporting and securing a tool on the other end portion, means for securing the tool supporting portion on the machine intermediate the reaction portion and the workpiece and releasable to permit linear adjustment between the block end portions deflecting the intermediate spring portion, a plunger reciprocably mounted in the reaction and intermediate spring portions of the block and normally engaging the tool supporting block portion, and tool adjusting means supported by the reaction portion of the block and operably connected through the plunger to shift the tool supporting block portion to effect and maintain desired tool adjustment relative to the workpiece against the deflective biasing action of the intermediate spring portion when the means securing the tool supporting portion is released to permit such adjustment.

10. An adjustable tool support mountable on a machine in spaced relation to a machine mounted workpiece, said tool support comprising an elongated block mountable on the machine transversely of the workpiece and intersected intermediate its ends to form an intermediate spring portion deflectably joining opposite sides of the spaced end portions of the block and permitting linear adjustment therebetween, the workpiece adjacent end portion of the block supporting a tool for workpiece engagement, means for securing the other end portion on the machine to form a fixed reaction portion spaced from the workpiece, means for adjusting the tool supporting portion parallel to the fixed reaction portion of the block and cooperating with the deflective biasing action of the intermediate spring portion to maintain tool adjustment therebetween, and means for securing the tool supporting portion on the machine to maintain effected tool adjustment relative to the workpiece and releasable to permit linear adjustment between the block end portions.

11. In an adjustable tool support mountable on a machine in spaced relation to a machine mounted workpiece, a tool supporting block mountable on the machine and having an intermediate spring portion deflectably joining spaced end portions of the block to permit linear adjustment therebetween transversely of the workpiece, the workpiece adjacent end portion of the block having means thereon for supporting a tool for workpiece engagement, means for securing the other block end portion on the machine independently of the tool supporting portion to form a fixed reaction portion spaced from the workpiece, adjusting means operable to shift the tool supporting portion parallel to the fixed reaction portion of the block against deflective biasing action of the intermediate spring portion tending to maintain linear tool adjusting engagement therebetween, and means for securing the tool supporting end portion on the machine to maintain effected tool adjustment relative to the workpiece.

References Cited by the Examiner
UNITED STATES PATENTS

| | | | |
|---|---|---|---|
| 2,988,943 | 6/1961 | Trible | 82—36 |
| 3,051,029 | 8/1962 | Cashmann et al. | 82—36 |

WILLIAM W. DYER, JR., *Primary Examiner.*